H. E. KINGSLEY AND G. C. RICHMOND.
PHOTOGRAPHIC DISTANCE FINDER.
APPLICATION FILED DEC. 7, 1916.
1,318,155.
Patented Oct. 7, 1919.
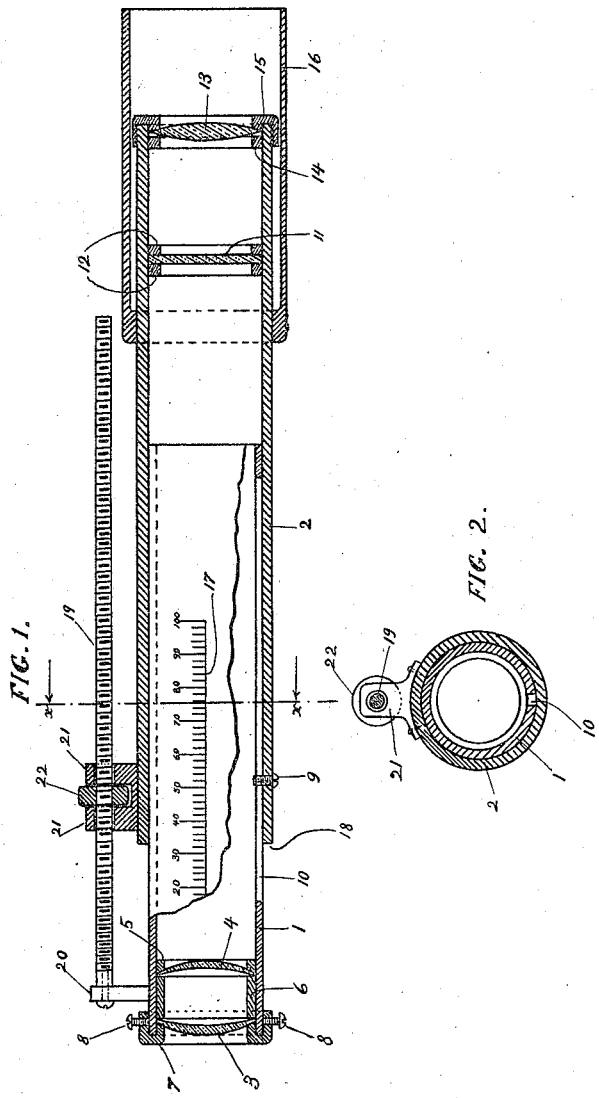
WITNESSES:
INVENTORS.
HERBERT E. KINGSLEY & GEORGE C. RICHMOND.
THEIR ATTORNEY.

UNITED STATES PATENT OFFICE.

HERBERT E. KINGSLEY AND GEORGE C. RICHMOND, OF CHICAGO, ILLINOIS.

PHOTOGRAPHIC DISTANCE-FINDER.

1,318,155. Specification of Letters Patent. Patented Oct. 7, 1919.

Application filed December 7, 1916. Serial No. 135,691.

*To all whom it may concern:*

Be it known that we, HERBERT E. KINGSLEY and GEORGE C. RICHMOND, citizens of the United States, and residents of the city of Chicago, county of Cook, and State of Illinois, have jointly invented certain new and useful Improvements in Photographic Distance-Finders, of which the following is a specification.

Our invention relates to photographic distance finders, that is to devices designed for use in photography, for ascertaining the distance of an object to be photographed from the photographer, in order to facilitate accurate focusing of the camera, and thus to aid in obtaining clear, distinct pictures.

The object of our invention is the production of a device of the character mentioned which will be of durable and economical construction, one which may be readily and easily operated, and one which will be highly efficient in use.

Other objects will appear hereinafter.

With these objects in view, the invention consists in the combinations and arrangements of parts hereinafter described and claimed.

The invention will be best understood by reference to the accompanying drawings forming a part of this specification, and in which, Figure 1 is a longitudinal section of a photographic distance finder embodying the invention, and Fig. 2 is a section taken on line *x*—*x* of Fig. 1.

The preferred form of construction, as illustrated in the drawings, comprises two slidably connected telescoping tubes 1 and 2. In the front end of tube 1 is arranged a pair of photographic lenses 3 and 4. Said lenses are detachably secured in position, the lens 4 seating against a stationary rim or collar 5 anchored in the tube 1, the lens 3 being separated from the lens 4 by means of a removable sleeve or collar 6. A collar 7 embraces the outer end of tube 1 and engages against the outer side of the lens 3 to securely fasten the same in position, as will be readily understood. Screws 8 coöperate with collar 7 for fastening the same to tube 1.

Relative sliding of tubes 1 and 2 is limited by means of a screw 9 threaded in the tube 2 which engages at its inner end in an elongated longitudinally extending slot 10 provided in tube 1. The screw 9 thus serves to prevent accidental disconnection of the tubes when the device is extended.

Mounted in the tube 2, adjacent the rearward end thereof, is a ground glass or other suitable translucent element 11 onto which the photographic lenses 3 and 4 are adapted to project the image of the object to be photographed. The ground glass 11 is securely held in position by collars 12 which are anchored in tube 2. Provided at the rearward end of tube 2 is a magnifying glass 13 adapted, during use of the device, to magnify the image on ground glass 11 and thus facilitate accurate setting or adjustment of the device, said magnifying glass making it possible to more readily determine when a clear, distinct image is projected by the photographic lenses onto ground glass 11. The magnifying glass 13 is also removably mounted, the same resting at its inner side against a coller 14 anchored in tube 2, a removable collar 15 threaded upon the rearward end of said tube serving to fasten said magnifying glass in position.

Slidably engaging with the rearward end of tube 2 is a tubular shield 16, the function of which is to shut out any lateral light from the eye during employment of the device, the rearward end of said shield, in the use of the device, being pressed against the face encircling the eye.

Arranged upon the outer side of tube 1 is a series of graduations or linear scale 17, this series of graduations or scale indicating longitudinal distance in units of feet, although any other unit may be employed if desired. Said scale coöperates with the front edge 18 of the tube 2, the same being adapted to indicate the distance of the operator from the object with which the device is adjusted into focus. Sliding adjustment of the tubes 1 and 2 is effected by means of a screw 19 the front end of which is fixed to a lug 20 projecting from tube 1, the rearward end of said screw slidably engaging with a slotted lug 21, between the divided portions of which is arranged a knurled thumb nut 22 threaded upon said screw. The arrangement is such, as will be seen, that the tubes 1 and 2 may be slidably adjusted through simply rotating the nut 22.

In using the device, the same is placed to the eye of the operator or photographer, and the nut 22 manipulated until the image of the distant object which it is desired to photograph, appears clear and distinct upon the ground glass 11. When said image so appears, having been projected thereon through the photographic lenses 3 and 4, the distance of the operator or user of the device from the object, will be indicated by the graduation 17 which registers with the front edge of tube 2. The precise distance having thus been ascertained, it is then a simple matter to adjust the camera in order to secure the proper focus in taking the picture. Through the use of a device of this character, it is apparent that the spoiling of great many pictures, through improper focusing of the camera, will be prevented. The device will thus be a positive money saver to camera users, and at the same time will insure good results, so far as focusing is concerned, which is, of course, always desired.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. In a photographic distance finder, the combination of a tubular body; a tubular slide mounted so as to slide in the inner end of said body; a photographic lens mounted in the outer end of said tubular slide; a magnifying lens mounted in the outer end of said tubular body; a ground glass mounted in said tubular body between said photographic lens and said magnifying glass; manually operable means for slidably adjusting said tubes and retaining the same in positions of adjustment; means for preventing the displacement of said inner slide from said tubular body; and a tubular shield telescoping with said before-mentioned tubes and adapted to shield the eye from the lateral entrance of light during use of the instrument, substantially as described.

2. In a photographic distance finder, the combination of a tubular body; a tubular slide mounted so as to slide in the inner end of said body; a photographic lens mounted in the outer end of said tubular slide; a magnifying lens mounted in the outer end of said tubular body; a ground glass mounted in said tubular body between said photographic lens and said magnifying glass; manually operable means for slidably adjusting said tubes and retaining the same in positions of adjustment; and means for preventing the displacement of said inner slide from said tubular body; said means comprising a stud secured to said tubular slide and adapted to coöperate with an elongated slot in said tubular body, substantially as described.

In testimony whereof we have signed our names to this specification in the presence of two subscribing witnesses.

HERBERT E. KINGSLEY.
GEORGE C. RICHMOND.

Witnesses:
JOSHUA R. H. POTTS,
B. G. RICHARDS.